March 24, 1959 D. E. LIPFERT 2,878,682
SNAP-ACTION MOVEMENT
Filed Sept. 26, 1956 6 Sheets-Sheet 1
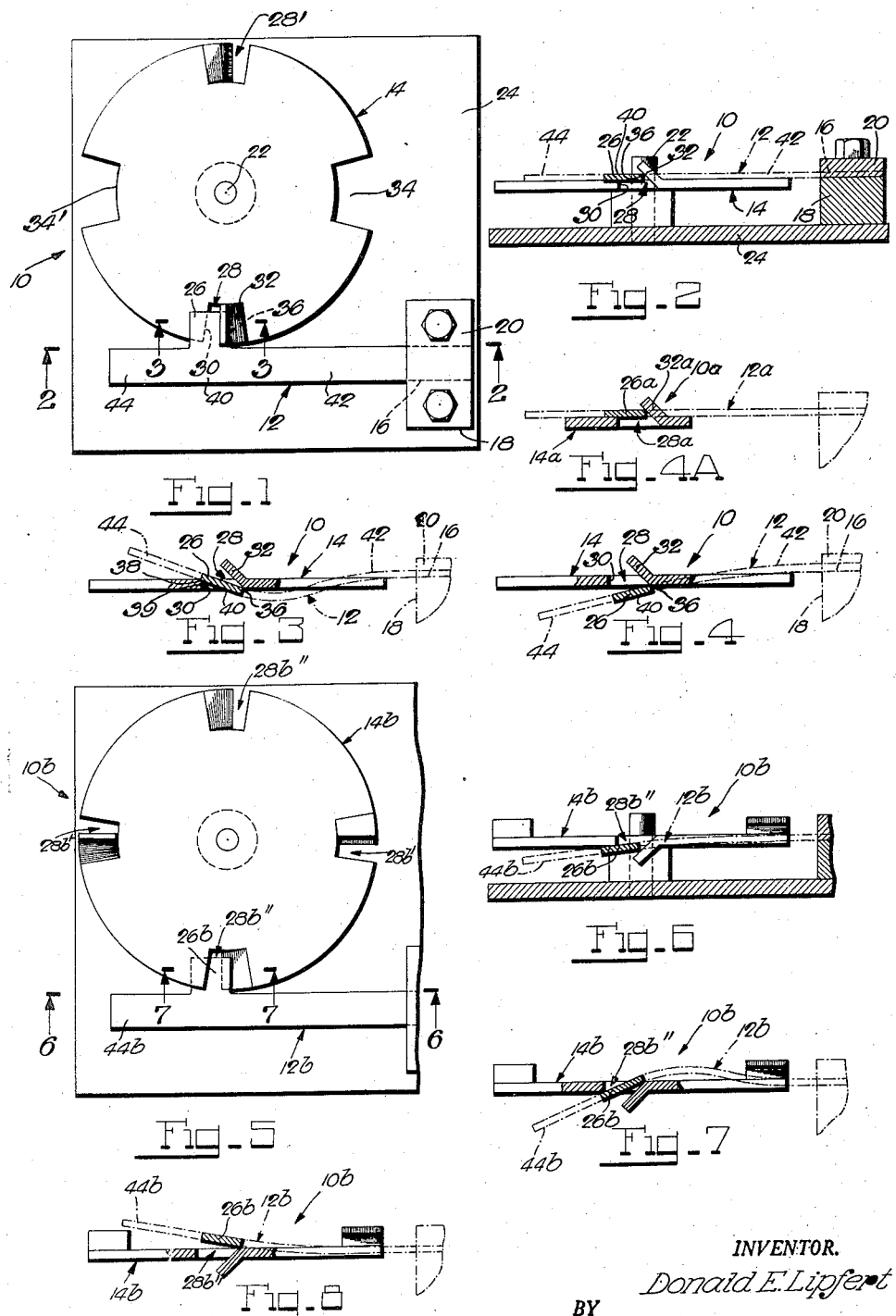
INVENTOR.
Donald E. Lipfert
BY
Attorney.

March 24, 1959   D. E. LIPFERT   2,878,682
SNAP-ACTION MOVEMENT
Filed Sept. 26, 1956   6 Sheets-Sheet 2

INVENTOR.
Donald E. Lipfert
BY
Attorney.

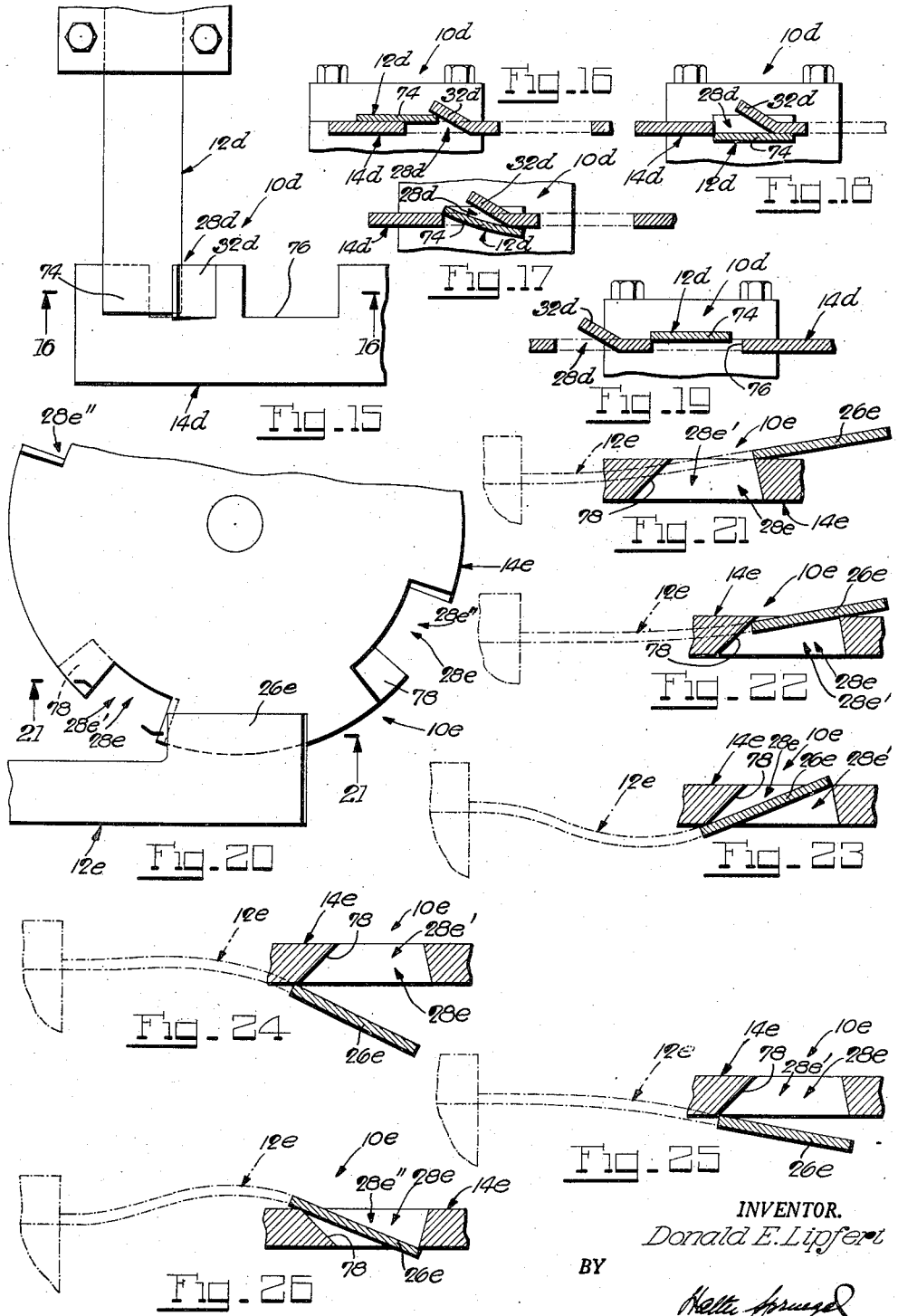

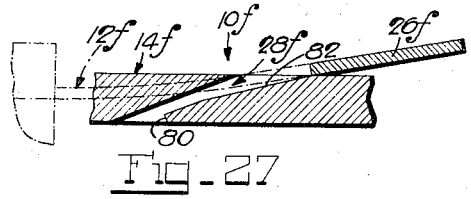
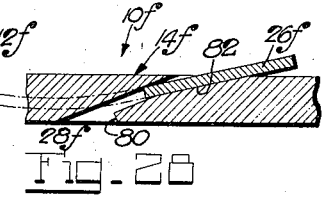
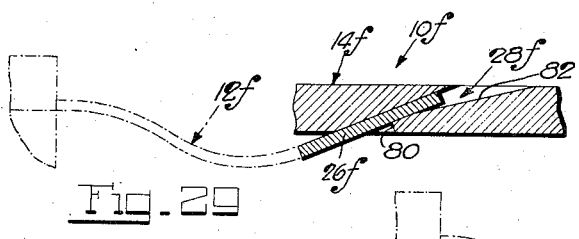
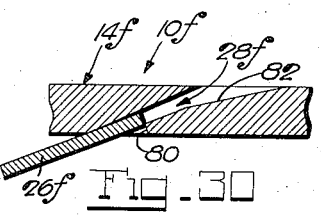
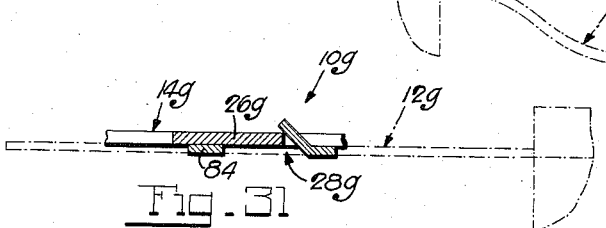
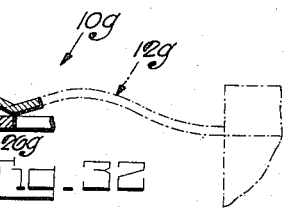
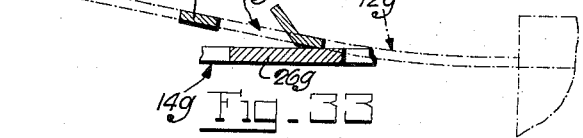
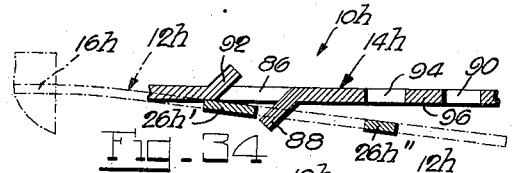
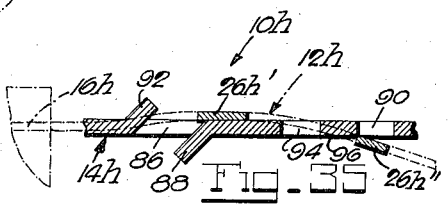
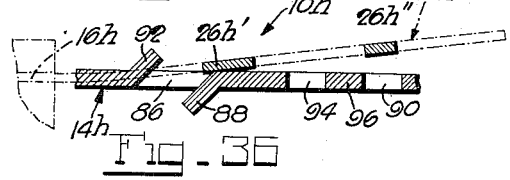
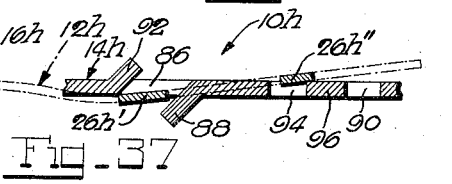
INVENTOR.
Donald E. Lipfert
BY
Attorney.

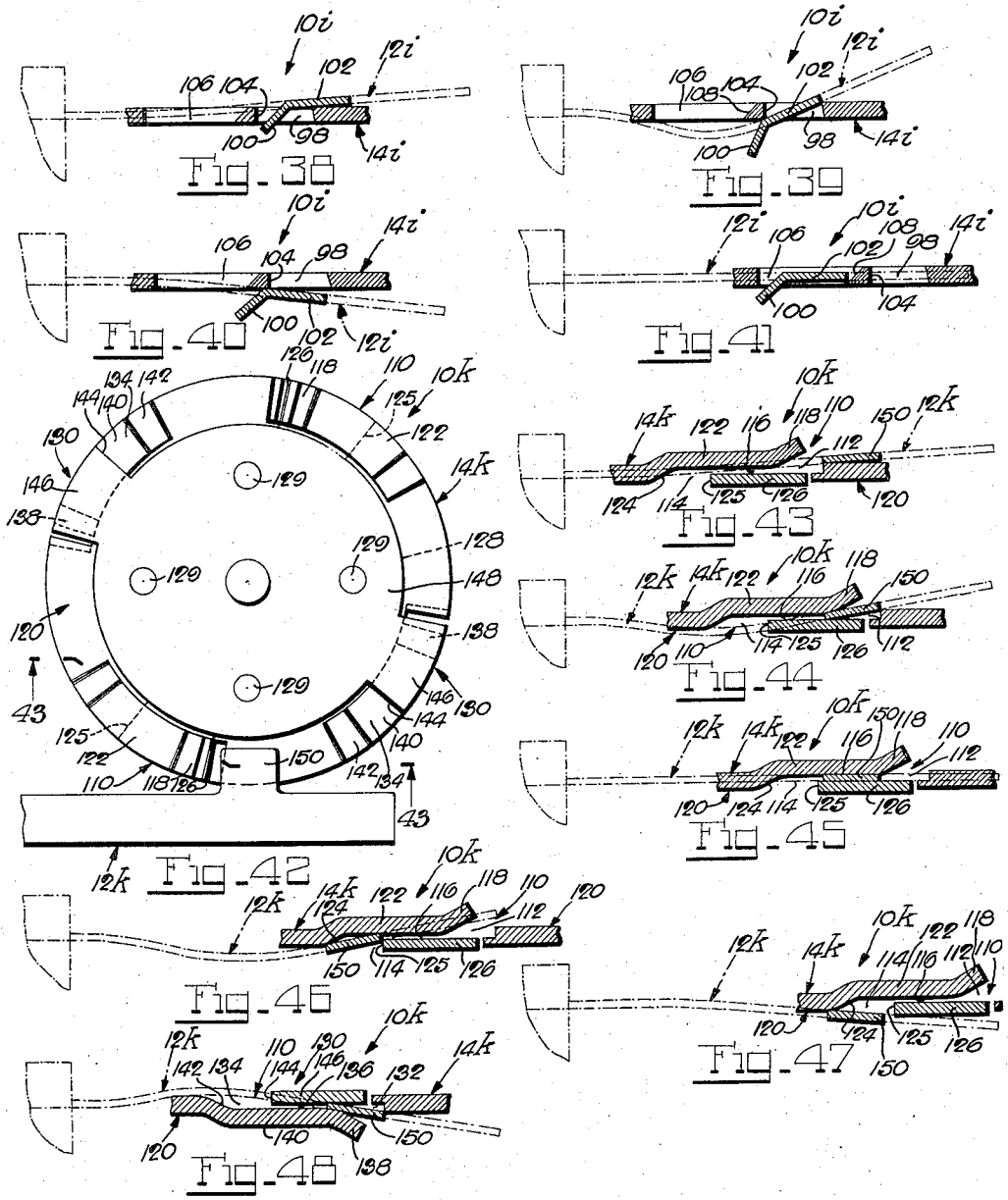

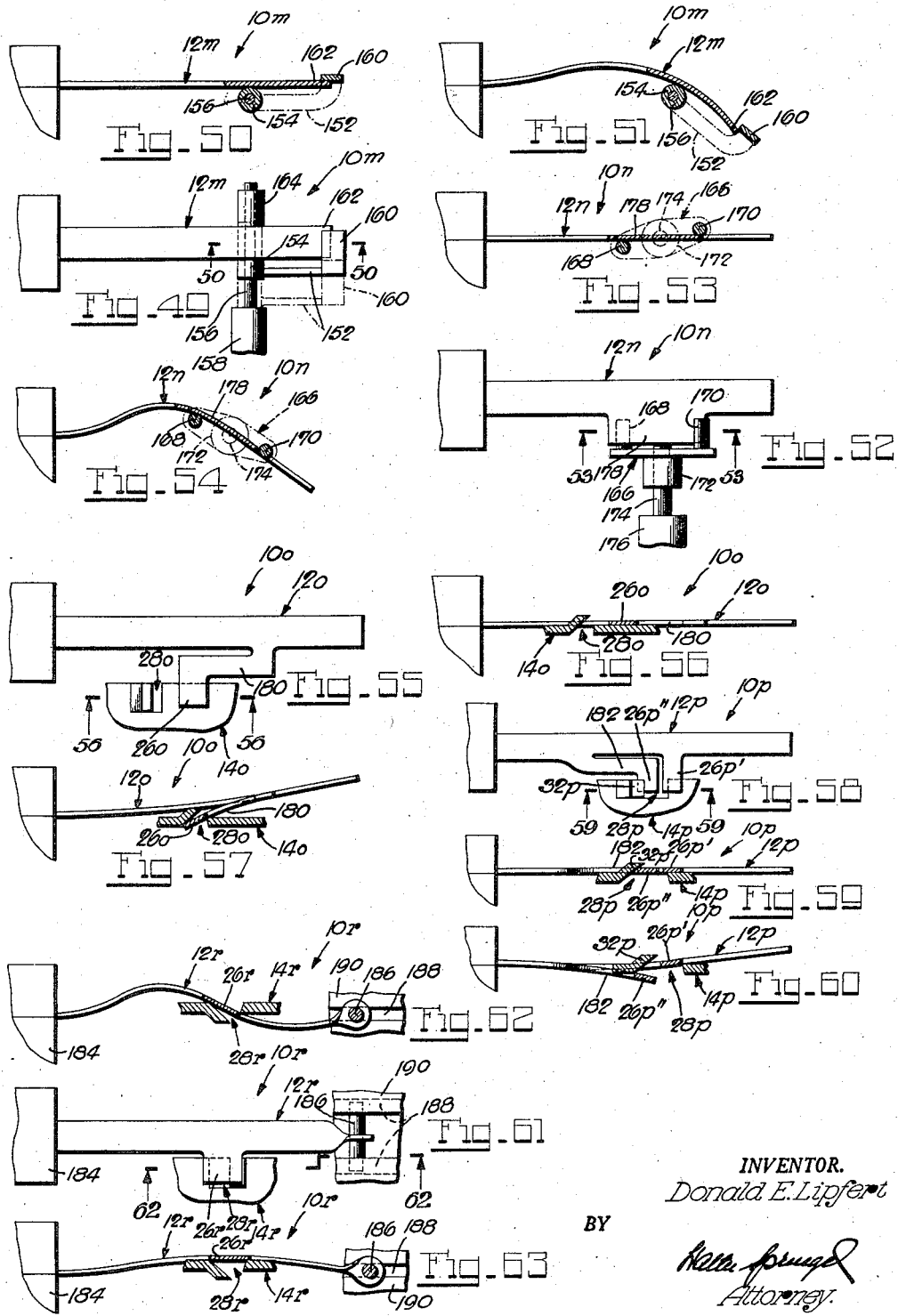

United States Patent Office 2,878,682
Patented Mar. 24, 1959

2,878,682
SNAP-ACTION MOVEMENT

Donald E. Lipfert, Middletown, Conn., assignor to The E. Ingraham Company, Bristol, Conn., a corporation of Connecticut Application September 26, 1956, Serial No. 612,125

24 Claims. (Cl. 74—100)

This invention relates to mechanical movements in general, and to snap-action movements in particular.

The movement to which the present invention pertains is of the type in which the output element performs in snap-motion fashion for many practical applications, such as an intermittent drive or for switch operations, for example.

It is among the objects of the present invention to provide a movement of this type of which the output element is a cantilever-like leaf spring which is normally resiliently distorted not at all or only incidentally and then negligibly, but is resiliently distorted positively prior to each snap-action momentarily only and to such an extent that it will on sudden release in its distorted condition recover with a snap-action which in force and amplitude may be quite considerable and is in any event fully adequate for many intended practical applications.

It is another object of the present invention to provide a movement of this type which consists of only a few simple parts that readily lend themselves to highly efficient mass production and assembly, so that the cost of the movement is exceedingly low.

It is a further object of the present invention to provide a movement of this type of which the aforementioned leaf spring is resiliently distorted by being forced into simple flexure, so that on its sudden release in resiliently flexed condition the ensuing snap-action recovery thereof may be of the aforementioned considerable force and amplitude.

Another object of the present invention is to provide a movement of this type of which the aforementioned leaf spring is resiliently distorted by being forced into S flexure, thereby increasing the force of the snap-action recovery of the spring on its sudden release in resiliently flexed condition.

A further object of the present invention is to provide a movement of this type in which a first length of the aforementioned leaf spring which is continuous with another length thereof extending to the cantilever support is by an applied force resiliently flexed about the junction of these lengths as a fixed fulcrum so that both of these spring lengths are compelled into S flexure, whereupon the spring is suddenly released in its resiliently flexed condition for recovery about said fixed fulcrum, thereby even further increasing the force of the snap-action recovery of the spring.

It is another object of the present invention to provide a movement of this type in which the aforementioned fixed fulcrum is displaced from the plane of the leaf spring in its normal substantially non-flexed condition to that side thereof which is opposite to that to which the aforementioned first spring length is flexed, thereby still further increasing the force of the snap-action recovery of the spring on its sudden release in resiliently flexed condition.

It is a further object of the present invention to provide a movement of this type in which the aforementioned first spring length is resiliently flexed preferably by a wedge-like cam action thereon, thereby to achieve quite considerable resilient deflection of the spring and, hence, snap-action recovery of the aforementioned considerable force, with a relatively small cam force and, hence, relatively little power.

Another object of the present invention is to provide a movement of this type in which the aforementioned preferred wedge-like cam action on the leaf spring element is achieved by cam devices on the latter and on an actuator element, respectively, which on uninterrupted relative movement between these elements cooperate gradually to flex the aforementioned first spring length increasingly about its junction with the continuing spring length as a fixed fulcrum, and then suddenly release the spring element for snap-action recovery about said fixed fulcrum.

A further object of the present invention is to provide a movement of this type in which the aforementioned cam devices on the elements are advantageously formed as relatively inclined cam-track and follower-tab formations, respectively, with the tab formation preferably arranged as a simple lateral extension on the aforementioned first length of the spring element, so that these formations may cooperate in flexing the spring element and suddenly releasing it for snap-action recovery on relative movement between these elements preferably in the plane of the spring element in its normal substantially non-flexed condition, and preferably also in such direction that the spring element is under longitudinal tension when resiliently flexed.

It is another object of the present invention to provide a movement of this type in which the aforementioned cam-track formation on the actuator element is expeditiously and advantageously formed by a simple stamping operation on the latter, by stamping a longitudinal notch in a margin of this element with the stamped-out tongue left continuous with the rest of the element at one end of the notch, and bending this tongue, or a shortened length thereof, out of the notch so as to form with said margin of the element an acute angle which points away from the notch.

It is a further object of the present invention to provide a movement of this type in which the aforementioned actuator element may be provided with a plurality of cam-track formations which, moreover, may be oppositely inclined to each other and to the follower-tab formation on the spring element so that the latter may be flexed in opposite directions and suddenly released for snap-action recovery also in opposite directions, thereby to achieve different combinations of snap-actions of the spring element sequentially and directionally on relative movement between the elements.

Another object of the present invention is to provide a movement of this type in which the aforementioned actuator element may be a rotary disc having in its periphery preferably a plurality of cam-track formations which cooperate with the follower-tab formation on the spring element repeatedly to flex the latter and suddenly release it for snap-action recovery in the same or opposite directions on merely turning the disc in the same direction.

A further object of the present invention is to provide a movement of this type in which the aforementioned actuator element may be a reciprocatory plunger or slide having preferably more than one cam-track formation so arranged as to cooperate with the follower-tab formation on the spring element in repeatedly flexing the latter and suddenly releasing it for snap-action recovery either in the same direction or in opposite directions, either on repeated movement of the plunger in the same direction or on movement of the same in opposite directions, It is another object of the present invention to provide a movement of this type in which the aforementioned actuator element may have cam-tract formations so arranged that they will, on relative movement between the elements cooperate with the follower-tab formation on the spring element sequentially to flex the latter and suddenly release it for snap-action recovery in opposite directions, not directly but via an intermittent rest position in which it is substantially non-flexed.

It is a further object of the present invention to provide a movement of this type in which the aforementioned follower-tab formation on the spring element is arranged in two adjacent separate sections of which a first section is directly joined to the spring element proper and the second section is by an integral longitudinal tongue on the spring element proper joined to the latter at a distance from the first section. In thus arranging the follower-tab in sections, both sections will, on relative movement between the elements and ensuing cooperation between these sections and a cam-track formation on the actuator element, directly flex a length of the spring element proper which exceeds the overall length of the tab sections and is substantially equal to the aforesaid distance between their joints with the spring element proper, thereby to achieve with a minimum cam force snap-action motion of the spring element which is entirely adequate for some practical applications.

Another object of the present invention is to provide a movement of this type in which the free end of the aforementioned spring element may be guided for rectilinear movement so that its lengthwise snap-like recovery after sudden release in resiliently flexed condition may be utilized for applications requiring relatively short but exceptionally powerful step motions.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a plan view of a snap-action movement embodying the present invention;

Fig. 2 is a section taken on the line 2—2 of Fig. 1;

Fig. 3 is a fragmentary section through the movement as taken on the line 3—3 of Fig. 1, with the operating elements in a different cooperative relation, however;

Fig. 4 is a fragmentary section similar to Fig. 3, with the operating elements of the movement in still another cooperative relation;

Fig. 4A is a fragmentary section through a snap-action movement embodying the present invention in a modified manner;

Fig. 5 is a plan view of a snap-action movement embodying the present invention in another modified manner;

Fig. 6 is a section taken on the line 6—6 of Fig. 5;

Figs. 7 and 8 are fragmentary sections taken on the line 7—7 of Fig. 5, with the operating elements of the modified movement shown in different cooperative relation, however;

Figure 9:
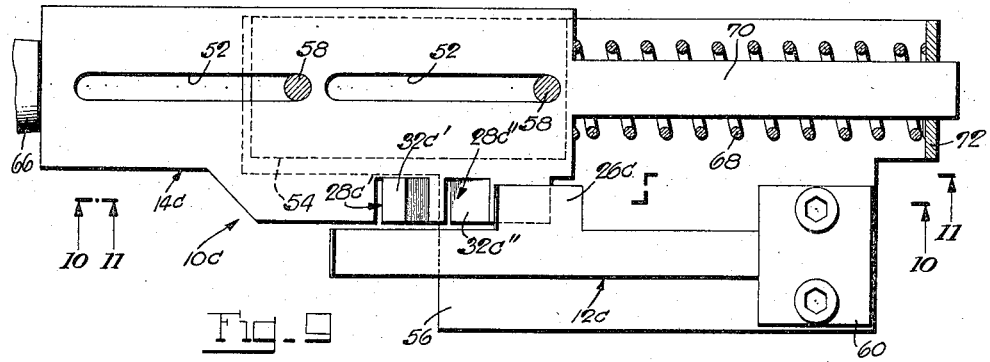
Fig. 9 is a fragmentary plan view, partly in section, of a snap-action movement embodying the present invention in another modified manner.
Figure 11:
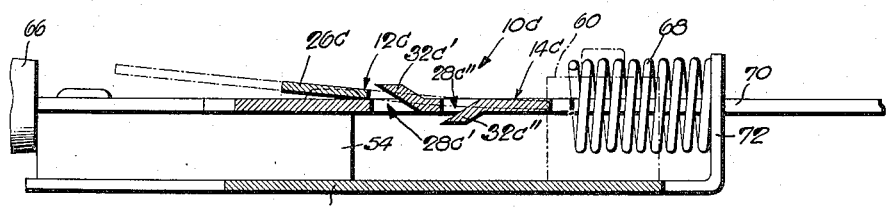
Fig. 11 is a section taken on the line 11—11 of Fig. 9, with the operating elements of the modified movement of Fig. 9 in a different cooperative relation, however.
Figure 12:
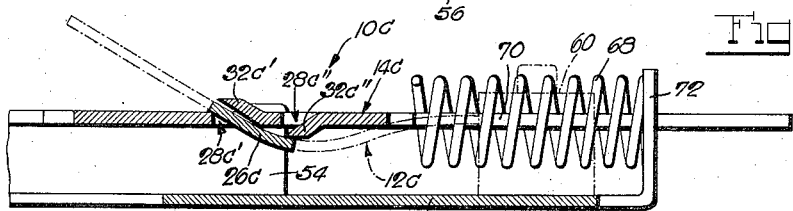
Figure 13:
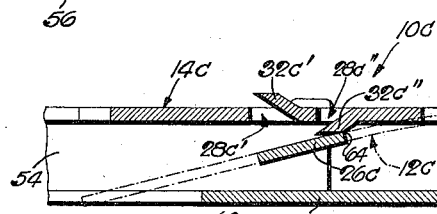
Figure 14:
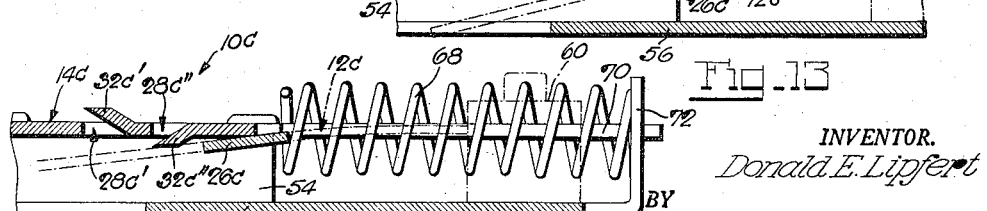

Figs. 12 to 14, inclusive, are sections similar to Fig. 11, with the operating elements of the modified movement of Fig. 9 in still other cooperative relations, however;

Fig. 15 is a fragmentary plan view of a snap-action movement embodying the present invention in a further modified manner;

Fig. 16 is a fragmentary section taken on the line 16—16 of Fig. 15;

Figs. 17, 18 and 19 are fragmentary sections similar to Fig. 16, but showing the operating elements of the modified movement of Fig. 15 in different cooperative relations;

Fig. 20 is a fragmentary plan view of a snap-action movement embodying the present invention in a further modified manner;

Fig. 21 is a fragmentary section taken on the line 21—21 of Fig. 20;

Figs. 22 to 26, inclusive, are fragmentary sections similar to Fig. 21, but showing the operating elements of the modified movement of Fig. 20 in different cooperative relations;

Fig. 27 is a fragmentary section through a snap-action movement embodying the present invention in a further modified manner;

Figs. 28, 29 and 30 are sections similar to Fig. 27, but showing the operating elements of the modified movement of Fig. 27 in different cooperative relations;

Fig. 31 is a fragmentary section through a snap-action movement embodying the present invention in another modified manner;

Figs. 32 and 33 are sections similar to Fig. 31, but showing the operating elements of the modified movement of Fig. 31 in different cooperative relations;

Fig. 34 is a fragmentary section through a snap-action movement embodying the present invention in a further modified manner;

Figs. 35, 36 and 37 are sections similar to Fig. 34, but showing the operating elements of the modified movement of Fig. 34 in different cooperative relations;

Fig. 38 is a fragmentary section through a snap-action movement embodying the present invention in another modified manner;

Figs. 39, 40 and 41 are sections similar to Fig. 38, but showing the operating elements of the modified movement of Fig. 38 in different cooperative relations;

Fig. 42 is a fragmentary plan view of a snap-action movement embodying the present invention in a further modified manner;

Fig. 43 is a fragmentary section taken on the line 43—43 of Fig. 42;

Figs. 44 to 48, inclusive, are sections similar to Fig. 43, but showing the operating elements of the modified movement of Fig. 42 in different cooperative relations;

Fig. 49 is a fragmentary plan view of a snap-action movement embodying the present invention in another modified manner;

Fig. 50 is a section taken on the line 50—50 of Fig. 49;

Fig. 51 is a section similar to Fig. 50, but showing the operating elements of the modified movement of Fig. 49 in a different cooperative relation;

Fig. 52 is a fragmentary plan view of a snap-action movement embodying the present invention in a further modified manner;

Fig. 53 is a section taken on the line 53—53 of Fig. 52;

Fig. 54 is a section similar to Fig. 53, but showing the operating elements of the modified movement of Fig. 52 in a different cooperative relation;

Fig. 55 is a fragmentary plan view of a snap-action movement embodying the present invention in another modified manner;

Fig. 56 is a section taken on the line 56—56 of Fig. 55;

Fig. 57 is a section similar to Fig. 56, but showing the operating elements of the modified movement of Fig. 55 in another cooperative relation;

Fig. 58 is a fragmentary plan view of a snap-action movement embodying the present invention in another modified manner;

Fig. 59 is a section taken on the line 59—59 of Fig. 58;

Fig. 60 is a section similar to Fig. 59, but showing the operating elements of the modified movement of Fig. 58 in a different cooperative relation;

Fig. 61 is a fragmentary plan view of a snap-action movement embodying the present invention in still another modified manner;

Fig. 62 is a section taken on the line 62—62 of Fig. 61; and

Fig. 63 is a section similar to Fig. 62, but showing the operating elements of the modified movement of Fig. 61 in a different cooperative relation.

Referring to the drawings, and more particularly to Figs. 1 to 4 thereof, the reference numeral 10 designates a snap-action movement having a resiliently flexible longitudinal member 12 with a longitudinal axis and of greater width than thickness, and an actuator member 14. Member 12 is presently in the form of a leaf spring which with one end 16 is supported, in cantilever fashion, on a block 18 by a retainer plate 20, for instance. The actuator member 14 is, in the present example, a rigid disc which is turnably mounted on a stud 22 on a base 24 on which the block 18 may conveniently be mounted also.

The spring and actuator members 12 and 14 are provided with devices which on certain relative movement between the former cooperative in resiliently flexing at least a length of the spring member 12 and suddenly releasing the same for a snap-action recovery of the spring member. To this end, the spring member 12 is, in the present instance, provided with a preferably integral tab 26 which is remote from the supported end 16 of the spring member. To the same end also, the actuator member or disc 14 is at its periphery provided with a cam track 28 which, in the present instance, is constituted by a notch 30 in, and an inclined tongue or lug 32 on, a peripheral margin of the disc 14. The notch 30 is conveniently formed in the actuator disc 14 by stamping therefrom a tongue 32 which is left continuous with the disc at one end of the notch 30, the tongue 32, or a shortened length thereof as in the present example, being bent from the notch 30 so as to form with the disc an acute angle pointing away from the notch 30. The actuator disc or member 14 is, in the present instance, further provided in its periphery with a clearance notch 34 at some distance from the cam track 28.

In the present exemplary snap-action movement 10, the spring member 12 is non-flexed when its tab 26 rests on top of the actuator member (Fig. 2). In order to achieve a snap-action of the movement, the actuator member 14 is turned clockwise as viewed in Fig. 1, so that the inclined tongue 32 of the cam track 28 approaches and finally engages the adjacent end 36 of the tab 26 on the spring member 12 which is equivalent to a first length of the spring member (Figs. 1 and 2). On continued clockwise rotation of the actuator member 14, the end 36 of the tab 26 is by the inclined tongue 32 gradually cammed into and through the notch 30 with the tab being twisted by pivoting about the top edge 38 of the end 39 of the notch as a fulcrum, with the result that a length 40 of the spring member 12 which is contiguous with the tab is similarly twisted and more or less resiliently flexed. More particularly, the twist thus imparted to the tab 26 has the primary effect of twisting the associated spring length 40 of the leaf-type spring member 12 about an axis extending transversely of the longitudinal axis of said spring member within the length 40 thereof and widthwise of the leaf, so that the continuing length 42 of the spring member 12 extending to the supported spring end 16 is, in consequence, compelled into resilient S flexure, meaning that this continuing length 42 of the spring member conforms to the S-shaped configuration shown in dot-and-dash lines in Fig. 3. On slight continued clockwise rotation of the actuator member 14 beyond the position in Fig. 3, the twisted tab 26 will clear the end 39 of the notch 30 and thus suddenly release the similarly twisted spring length 40 and continuing resiliently flexed spring length 42 for a resilient snap-action of the spring member 12 about the contact area between the tab end 36 and the underside of the actuator member 14 as a fulcrum (Fig. 4). While the described snap-action of the spring member 12 from a position like or similar to that shown in Fig. 3 into the position shown in Fig. 4 entails some slight endwise motion of the same, this snap-action of the spring member is primarily in the nature of a powerful whip motion which is properly amplified to any desired extent by a free endlength 44 that extends beyond the length 40 thereof. It is this amplified whip motion of the free endlength 44 of the spring member 12 which may be utilized for many practical applications, such as for an intermittent drive of an associated mechanism or for switch operation, for instance.

On continued clockwise rotation of the actuator member 14 from the position in Fig. 4, the tab 26 on the spring member will eventually clear the other notch 34, thereby permitting the spring member to return to its original non-flexed condition (Fig. 2) for its next snap-action. While the next snap-action of the spring member 12 may be achieved by the same cam track 28, by simply turning the actuator member 14 in the opposite, counterclockwise direction as viewed in Fig. 1, with the tab 26 overriding the inclined tongue 32 of the cam track 28 and coming to rest on top of the actuator member in operative alignment with this track, the next snap action of the spring member is, in the present instance, achieved by an additional cam track 28′ in the actuator member 14, on continued clockwise rotation of the latter after the tab 26 has cleared the notch 34. The cam track 28′ may in all respects be like the described cam track 28 and perform on the spring member 12 and its tab 26 in exactly the same fashion as shown in Figs. 2 to 4. Of course, the actuator member 14 requires for its proper repeat performance on the spring member 12 by the cam track 28′ an additional clearance notch 34′ in association with the latter.

While in the described exemplary snap-action movement 10 the spring member 12 is fixedly supported at its end 16 and the actuator member is movable relative thereto by being turnable, it is, of course, fully within the purview of the present invention to achieve the requisite relative motion between the members 12 and 14 for a snap-action or actions of the spring member 12 by fixedly mounting the actuator member 14 and mounting the cantilever spring 12 for rotation about the axis of the latter.

With the present arrangement of a cam track or tracks on the actuator member and a follower tab on the spring member, snap-actions of the spring member of widely varying force and of widely varying amplitudes may readily be achieved. Thus, the force of the snap-action or its amplitude, or both, may be varied to suit, by providing the follower tab 26 on the spring member 12 closer to or farther away from its supported end 16, or by shortening the notch 30 of the cam track 28, or by increasing or decreasing the thickness of the actuator member 14, or by increasing or decreasing the stiffness of the spring member, or by lengthening or shortening, or even omitting, the free endlength 44 of the spring member, just to mention a few expediencies. Furthermore, the required torque for operating the actuator member is in any event relatively small in comparison to the force of the snap-action of the spring member, this by virtue of the favorable wedge-like cam action between the tab 26 and cam track 28. The present snap-action movement thus has important functional features and advantages, and is, moreover, exceedingly simple in construction and, hence, accordingly low in cost. As already mentioned, the main operating parts of the movement, i.e., the spring member 12 with its tab and the actuator member 14 with its cam track or tracks, may be formed by simple blanking or stamping and, hence, readily lend themselves to highly efficient and low-cost mass production and also assembly.

While the actuator member 14 in the described snap-action movement 10 is rotary, the same may also be reciprocatory. Thus, Fig. 4A shows a modified snap-action movement 10a of which the actuator member 14a is a reciprocatory plate or slide having, in this instance, a single cam track 28a which cooperates with a tab 26a on the spring member 12a. The cam track 28a will, on movement of the actuator slide 14a to the left, cooperate with the tab 26a in resiliently flexing the spring member 12a and suddenly releasing it for a snap-action. On continued motion of the actuator slide 14a thereafter to the left, the tab 26a will clear the adjacent end of the slide 14a and permit the spring member to snap back into its non-flexed condition, whereupon the actuator slide may be returned to the right in order to condition it for the next snap-action of the spring member, the tab 26a simply overriding the inclined tongue 32a of the cam track 28a in the course of the return motion of the actuator slide, as will be readily understood. Of course, the same snap-action of the spring member 12a could be achieved if the actuator plate 14a were fixed and the cantilever spring 12a reciprocated relative to the latter.

Reference is now had to Figs. 5 to 8 which show a modified snap-action movement 10b that differs from the previously described movements 10 and 10a primarily by being double-acting, in that the spring member has snap-actions in opposite directions. Thus, the instant exemplary movement 10b is much like the exemplary movement 10 of Fig. 1, except that cam tracks 28b' alternate with cam tracks 28b'' in the actuator member 14b. The cam tracks 28b' perform on the spring member 12b in exactly the same manner as perform the cam tracks 28 and 28' on the spring member 12 of the movement 10 (Fig. 4), in causing snap-actions of the spring member 12b with its free endlength 44b downward, while the cam tracks 28b'', being oppositely inclined to the spring member 12b, perform on the latter, on clockwise rotation of the actuator member 14b (Fig. 5), in gradually flexing the spring member (Fig. 7) and suddenly releasing it for a snap-action with its free endlength 44b upward (Fig. 8). The alternating cam tracks 28b' and 28b'' are, furthermore, so arranged in the actuator member 14b of the instant exemplary movement 10b that the snap-actions of the spring member will occur alternately in opposite directions on rotation of the actuator member in the same direction, i.e., clockwise as viewed in Fig. 5. Furthermore, the snap-actions of the spring member in opposite directions are of the same amplitude, this by virtue of the fact that the spring member is so supported that in its non-flexed condition the median plane thereof lies in, or substantially in, the median plane of the actuator member, and the camming actions of the cam tracks 28b' and 28b'' on the tab 26b are identical, save for direction. This means also that the spring member 12b is even in either of its alternate repose positions (one being shown in Fig. 8) resiliently flexed, though only negligibly, wherefore the spring member is at all times resiliently flexed, though to any considerable extent momentarily only prior to each snap-action thereof (Fig. 7). The opposite snap-actions of the spring member 12b of the instant movement are highly useful for many practical applications, as for on-and-off switching operations, for instance.

Reference is now had to Figs. 9 to 14 which show a modified exponent 10c of a double-acting movement of this type. Thus, while the double-acting movement 10b of Fig. 5 has a rotary actuator member 14b, the instant double-acting movement has a reciprocatory actuator member or slide 14c. The actuator slide 14c, which presently is provided with slots 52, is guided for rectilinear movement on a block 54 on a base 56 by pins 58 received in the slots 52 and projecting from the block 54. The actuator slide 14c has in its side adjacent the spring member 12c two successive cam tracks 28c' and 28c'' which are oppositely inclined to the spring member. The spring member 12c' is at one end thereof firmly mounted on a block 60 on the base 56, and has a side tab 26c which for a reason to be described is rather longer in comparison to the length of either cam track 28c' or 28c'' than in any of the previously described movements.

Figure 10:
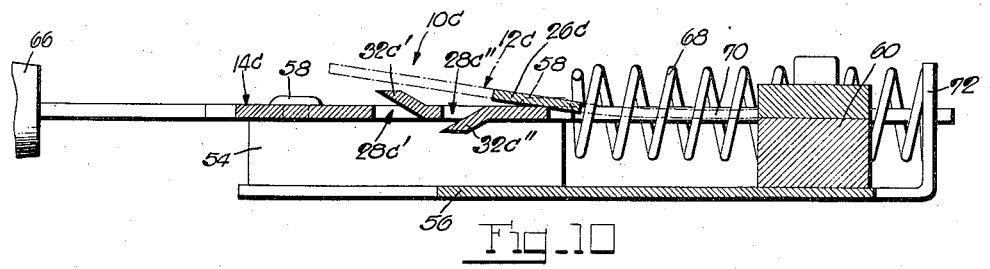
Fig. 10 is a section taken on the line 10—10 of Fig. 9.

Figs. 9 and 10 show the spring member 12c in one of its repose positions on top of the actuator slide 14c. In order to achieve a snap-action of the spring member 12c to the other side of, i.e., beneath, the actuator slide 14c, the latter is moved from the position in Figs. 9 and 10 to the right into the position in Fig. 11, in the course of which the tab 26c on the spring member overrides the inclined tongue 32c' of the cam track 28c' and comes to rest on top of the actuator slide in operative alignment with the cam track 28c'. On subsequently shifting the actuator slide 14c to the left toward and into the position shown in Fig. 12, the tab 26c will be cammed partially through the track 28c' and the spring member 12c will, in consequence, be resiliently flexed in a manner like or similar to that indicated in dot-and-dash lines in Fig. 12. It will be noted from Fig. 12 that the tab 26c, while still in the cam track 28c', has already bridged over the downwardly inclined tongue 32c'' of the cam track 28c'', so that the spring member will, on its subsequent release from the cam track 28c' on slight further motion of the actuator member 14c to the left from the position in Fig. 12, pivot in its snap-action about the underside of the actuator slide as a fulcrum, in this instance about the rear bottomedge 64 of the inclined tongue 32c'' of the cam track 28c'' (Fig. 13), and assuredly remain with its tab 26c on the underside of the actuator slide during the remaining motion of the latter from the position shown in Fig. 13 into the home or starting position shown in Fig. 14 in which the spring member is in its other repose position.

For the next snap-action of the spring member 12c, this time in the opposite direction, the actuator slide 14c is again moved from its starting position (Fig. 14) to the right, at least sufficiently until the cam track 28c'' is in operative alignment with the tab 26c, whereupon the motion of the actuator slide is reversed for cooperation between the tab 26c and cam track 28c'' in resiliently flexing the spring member and suddenly releasing it in its flexed condition for a snap-action above the actuator slide, the spring member finally coming to the repose position shown in Figs. 9 and 10 on returning the actuator slide to its starting position.

For its convenient manipulation, the actuator slide 14c is provided, in this instance, with a knob or handle 66. In this instance also, the actuator slide 14c is returned to its starting position by a compression spring 68 which surrounds a shank 70 on the actuator slide and is interposed between the latter and an upright lug 72 on the base 56. Hence, the operating or snap-action stroke of the actuator slide, in the present example into its starting position, is automatic, being achieved by the spring 68. The instant push-type double-acting snap-action movement 10c is highly useful for many practical applications, among them on-and-off switching operations.

Reference is now had to Figs. 15 to 19 which show a modified snap-action movement 10d that differs from the hereinbefore described movements primarily by having a torsional snap-action. Thus, the follower "tab" of the instant cantilever spring 12d is the free end 74 thereof which, on movement to the left (Fig. 15) of an exemplary reciprocatory actuator slide 14d, cooperates with a cam track 28d in the latter, with the result that the tab end 74 of the spring is gradually twisted to the maximum extent shown in Fig. 17, and is suddenly released in its twisted condition by the cam track with a resulting snap-action of the spring into the position shown in Fig. 18. The spring may thereafter return to its normal non-stressed condition when, on continued motion of the actuator slide 14d to the left, the tab end 74 thereof clears and snaps through the notch 76 in the actuator slide (Fig. 10). A repeat snap-action of the spring 12d may be accomplished on first shifting the actuator slide from the position in Fig. 19 to the right in order to bring the cam track 28d into operative realignment with the spring end 74, the latter simply overriding the inclined tongue 32d of the cam track during such return shift of the actuator slide.

Since in the present modified movement 10d the entire spring 12d acts in torsion when resiliently distorted by the cam track 28d, the ensuing snap-action of the spring on its sudden release in distorted condition by the cam track is quite powerful, though in this instance of relatively small amplitude. However, the amplitude of the snap-action of the spring 12d may be increased by making the latter wider throughout or providing it at its free end with an amplification arm or tab (not shown) of greater width than that of the spring.

While in the hereinbefore described snap-action movements the cam track or tracks in the actuator members thereof are expeditiously and advantageously formed by a stamping operation, these cam tracks may also be formed differently, if desired. Thus, Figs. 20 to 26 show a modified snap-action movement 10e of which the actuator member 14e, presently a rotary disc, is preferably of greater thickness than the actuator members of the hereinbefore described movements, and is provided in its periphery with machined cam tracks 29e in the form of notches having inclined cam ends 78. In order that the tab 26e, which in this instance is provided at the free end of the spring member 12e, may be brought into operative alignment with the cam tracks 28e which are wholly within the thickness of the actuator member 14e, the instant movement 10e is also of the double-acting type with the spring member so mounted at one end thereof that in its non-flexed condition the median plane thereof lies in the median plane of the actuator member or at least in a plane parallel thereto and within the latter. In thus mounting the spring member 12e, its tab 26e will assuredly project into operative alignment with each of the cam tracks 28e when the latter approach the former on counterclockwise rotation of the actuator member (Fig. 22).

Since the instant snap-action movement 10e is of the double-acting type as mentioned above, the cam tracks 28e are arranged in two groups of which the cam tracks 28e' of one group alternate with the cam tracks 28e'' of the other group, with the cam tracks of both groups inclined opposite to each other and to the spring member 12e (Figs. 23 and 26). Thus, with a cam track 28e' next to and in operative alignment with the tab 26e on the spring member in the exemplary position of the actuator member 14e in Figs. 20 and 21, this cam track 28e' will, on counterclockwise rotation of the actuator member, cooperate with the tab 26e of the spring member in gradually flexing the latter and suddenly releasing it in its flexed condition for a snap-action underneath the actuator member 14e, as shown in progressive stages in Figs. 22 to 25. Fig. 24 shows that the tab end of the spring member will, in the course of the snap-action of the latter, overwhip, or at least tend to overwhip, its repose position shown in Fig. 25 in which it will come to rest after the snap-action.

On continued rotation of the actuator member, counterclockwise as viewed in Fig. 20, the next cam track 28e'', which is now in operative alignment with the tab 26e of the spring member 12e in its repose position in Fig. 25, will cooperate with the tab in resiliently flexing the spring member (Fig. 26) and suddenly releasing it in its flexed condition for a snap-action to the top of the actuator member, as will be readily understood. Thus, the alternating cam tracks 28e' and 28e'' cooperate with the tab 26e in causing alternate snap-actions of the spring member in opposite directions on unidirectional rotation of the actuator member.

Figs. 27 to 30 show another modified snap-action movement 10f in which the cam track or tracks 28f in the actuator member 14f are inclined peripheral slots therein with which an exemplary tab end 26f of a spring member 12f cooperates in resiliently flexing the latter and suddenly releasing it in its flexed condition for a snap-action. Thus, Figs. 27 to 30 show a cam track 28f which is arranged to cause snap-action of the spring member below the actuator member, and these Figures further illustrate progressive stages in the cooperation between tab and cam track in bringing about resilient flexure of the spring member on movement of the actuator member to the right. Fig. 30 shows the tab end of the spring member at the moment of its release from the cam track, the latter being to this end cut away at 80. Also, in order that the cam track 28f may be in operative alignment with the tab end of the spring member and assuredly receive the same on movement of the actuator member to the right (Figs. 27 and 28), the cam track is at the top cut away as at 82 to permit the tab 26f to enter the track. Of course, such entry of the tab 26f into the cam track 28f requires that the former be resiliently urged against the top of the actuator member, and it is for this reason that the spring member is, at one end, mounted so that in its non-flexed condition the median plane thereof substantially coincides with the median plane of the actuator member. In thus mounting the spring member 12f, the instant movement is preferably also of the double-acting type, having another cam track or tracks (not shown) inclined oppositely to the cam track 28f, so that the tabs 26f may be in operative alignment with any cam track in the first place on mere normal operation of the actuator member which may be a rotatable disc, for instance.

While in the hereinbefore described snap-action movements the cam tracks are provided in the actuator members thereof and the follower tabs are provided on the spring members thereof, Figs. 31 to 33 show a modified snap-action movement 10g in which the cam track 28g and follower tab 26g are provided on the spring member 12g and actuator member 14g, respectively. Thus, the cam track 28g may conveniently be formed in a side extension 84 of the spring member by stamping, while the follower tab 26g may be an extension on a reciprocatory actuator member, or one of several angularly spaced peripheral extensions on a rotary actuator disc.

The instant exemplary movement 10g is of the single-acting type, the cam track 28g on the spring member 12g being arranged to effect snap-actions of the latter to the top of the actuator member. Thus, on moving the actuator member 14g with its tab 26g to the right as viewed in Fig. 31, the tab will cooperate with the cam track on the spring member in resiliently flexing the latter (Fig. 32). On continued movement of the actuator member from the position in Fig. 32 to the right thereof, the tab 26g will suddenly release the cam track 28g for a snap-action of the resiliently flexed spring member to the top of the actuator member (Fig. 33). In order to bring the tab 26g into operative realignment with the cam track 28g on the spring member for a repeat snap-action of the latter, the actuator member 14g is moved in either direction until the tab 26g clears the side extension 84 on the spring member 12g and permits the latter to return to its normal substantially non-flexed condition (Fig. 31).

While in each of the hereinbefore described snap-action movements, except movement 10d, the spring member is advantageously under longitudinal tension when resiliently flexed by a cam track, the present movement 10g is an exponent of one in which the spring member is, exemplary, under longitudinal compression when resiliently flexed by the cam track. Of course, it is fully within the purview of the present invention to arrange the cam track or tracks in each movement so that the associated spring member will be longitudinally tensioned or compressed when resiliently flexed.

Reference is now had to Figs. 34 to 37 which show a modified double-acting snap-action movement 10h that is of the same general push-and-pull type as the movement 10c of Fig. 9, but differs significantly from the latter by causing alternate snap-actions of the spring member 12h in opposite directions on movement of the actuator member 14h in opposite directions, respectively, during each reciprocation or single back-and-forth oscillation thereof, depending on whether the actuator member is mounted for turning or reciprocatory movement. To this end, the tab of the spring member 12h is arranged in the form of tab sections 26h' and 26h'' which are spaced from each other and also from the supported end 16h of the spring member. To this end also, the cam tracks for the opposite snap-actions of the spring member are arranged in sections. Thus, the cam track for each snap-action of the spring member to the top of the actuator member 14h is formed by a circumferential notch 86 in the actuator member and a downwardly inclined tongue 88 at the right end of the notch 86 (Fig. 34) as well as another circumferential notch 90 in the actuator member spaced from the notch 86. On the other hand, the cam track for each snap-action of the spring member below the actuator member is formed by the same circumferential notch 86 in the actuator member and an upwardly inclined tongue 92 at the left end of the notch 86 (Fig. 34) as well as another circumferential notch 94 in the actuator member spaced from both of the other notches 86 and 90.

Assuming that the spring member 12h is presently in one of its opposite repose positions, namely, its lower repose position shown in Fig. 34, and that a snap-action thereof is desired to the top of the actuator member 14h, the latter is moved to the left from the position in Fig. 34 to that of Fig. 35, in the course of which movement the inclined tongue 88 cams the tab section 26h' through the notch 86 and to the top of the actuator member while the other tab section 26h'' is held underneath the actuator member by its circumferential part 96 between the notches 90 and 94, with the result that the spring member 12h is resiliently flexed as indicated in dot-and-dash lines in Fig. 35. On slight continued movement of the actuator member 14h to the left beyond the position shown in Fig. 35, the circumferential notch 90 in the actuator member will suddenly clear the tab section 26h'' and release the same for a snap-action of the resiliently flexed spring member to the top of the actuator member (Fig. 36). If the next snap-action of the spring member is now desired, the actuator member 14h is shifted in the opposite direction, i.e., to the right from a position like or similar to that shown in Fig. 36, in the course of which movement the upwardly inclined tongue 92 cams the tab section 26h' through the notch 86 and to the bottom of the actuator member while the other tab section 26h'' is held on top of the actuator member by its circumferential part 96 between the notches 90 and 94, with the result that the spring member 12h is resiliently flexed as indicated in dot-and-dash lines in Fig. 37. On slight continued movement of the actuator member 14h to the right beyond the position shown in Fig. 37, the circumferential notch 94 in the actuator member will soon clear the tab section 26h'' and suddenly release the same for a snap-action of the resiliently flexed spring member, this time below the actuator member, as will be readily understood. The spring member will thus alternately snap in opposite directions on movements of the actuator member in opposite directions, respectively, of each reciprocation thereof.

Figs. 38 to 41 show a modified snap-action movement 10i having a cam track of the notch-and-inclined-tongue type of which the notch and tongue are separated, however, and in this instance provided in the actuator member 14i and on the spring member 12i, respectively. Thus, the actuator member 14i has a circumferential notch 98, while the inclined tongue 100 is provided on the side tab 102 on the spring member 12i.

Assuming that the spring and actuator members 12i and 14i are in the relative position shown in Fig. 38 and that a snap-action of the spring member is desired, the actuator member is moved from the position in Fig. 38 to the right into the position shown in Fig. 39. In the course of such movement of the actuator member, the end 104 of the notch 98 in the actuator member cooperates with the inclined tongue 100 on the tab 102 in camming the latter partially through the notch 98, with the result that the spring member is resiliently flexed as indicated in dot-and-dash lines in Fig. 39. On slight continued movement of the actuator member to the right beyond the position shown in Fig. 39, the notch 98 will suddenly release the tab 102 on the resiliently flexed spring member for a snap-action of the latter below the actuator member (Fig. 40).

The instant exemplary movement 10i is of the single-acting type, and it is for this reason that the spring member is at one end mounted so that in its non-flexed condition the median plane thereof substantially coincides with the median plane of the actuator member. Hence, on continued movement of the actuator member to the right beyond the position shown in Fig. 40, the tab 102 on the spring member will snap into a clearance notch 106 in the actuator member and be cammed on top of the latter by the inclined endwall 108 of the notch 106 on reverse movement of the actuator member, i.e., to the left from the position in Fig. 41. The spring member is thus brought to the top of the actuator member after each snap action thereof for the next snap-action, as will be readily understood. Of course, the spring member could be so mounted that it would of its own accord snap through the clearance notch 106 to the top of the actuator member, and the movement would nevertheless be fully operative if the inclined tongue 100 were made sufficiently long to cooperate with the end 104 of the notch 98 in camming the tab 102 through the latter, as will be readily understood.

Reference is now had to Figs. 42 to 48 which show a modified snap-action movement 10k of the double-acting type, of which the spring member 12k snaps into and from an intermediate neutral position, in which it is substantially non-flexed, on each snap-action thereof from one extreme position to the opposite extreme position, and vice versa. To this end, the cam tracks in the actuator member 14k are arranged in sections. Thus, each cam track 110 (Fig. 42) for a snap-action of the spring member 12k from its topmost position to its bottommost position via the aforementioned neutral position comprises a downwardly inclined peripheral cam notch 112 and a further downwardly inclined peripheral cam notch 114 which, in the present example, are joined by a peripheral track 116 (Figs. 43 to 47). The cam notch 112 is in this instance formed by stamping a tongue 118 from a peripheral margin of a main disc 120, leaving the tongue continuous with an upset marginal length 122 of the main disc 120 and bending the tongue 118, and in this instance a shortened length thereof, at the inclination shown in Fig. 43. The other cam notch 114 is defined beneath the upset marginal length 122 of the main disc 120 between its cam-like junction 124 with the main disc proper and the adjacent end 125 of a peripheral tab extension 126 on a disc 128 riveted or otherwise secured at 129 to the main disc 120 at the bottom thereof. Finally, the track 116 which joins the cam notches 112 and 114 is defined by the upset marginal length 122 of the main disc 120 and the tab extension 126 on the disc 128 therebeneath.

Each cam track 130 (Figs. 42 and 48) for a snap-action of the spring member 12k from its bottommost position to its topmost position via the aforementioned neutral position comprises an upwardly inclined peripheral cam notch 132 and a further upwardly inclined peripheral cam notch 134 which, in the present example, are joined by a peripheral cam track 136. The cam notch 132 is in this instance formed by stamping a tongue 138 from a peripheral margin of the main disc 120, leaving the tongue continuous with an upset marginal length 140 of the main disc 120 and bending the tongue 138, and in this instance a shortened length thereof, at the inclination shown in Fig. 48. The other cam notch 134 is defined above the upset marginal length 140 of the main disc 120 between its cam-like junction 142 with the main disc proper and the adjacent end 144 of a peripheral tab extension 146 on a disc 148 secured at 129 to the main disc 120 at the top thereof. Finally, the track 136 which joins the cam notches 132 and 134 is defined by the upset marginal length 140 of the main disc 120 and the tab extension 146 on the disc 148 thereabove.

Assuming the spring member 12k to be on top of the actuator member 14k and the latter to be in the angular position shown in Figs. 42 and 43, a snap-action of the spring member 12k from its topmost position into neutral position is achieved on rotation of the actuator member in counterclockwise direction (Fig. 42). During such counterclockwise rotation of the actuator member, the cam notch 112 of the cam track 110 nearest to the spring member will cooperate with the tab 150 on the spring member in resiliently flexing the latter as indicated in dot-and-dash lines in Fig. 44. On continued slight counterclockwise rotation of the actuator member beyond the position shown in Fig. 44, the cam notch 112 will suddenly release the tab 150 on the resiliently flexed spring member for a snap-action of the latter into neutral position. During further continued counterclockwise rotation of the actuator member the tab 150 will pass through the track 116 and thus hold the spring member in the neutral position shown in dot-and-dash lines in Fig. 45. On further continued counterclockwise rotation of the actuator member, the other or trailing cam notch 114 will come into cooperative relation with the tab 150, with the result that the spring member will be resiliently flexed as indicated in dot-and-dash lines in Fig. 46. On continued slight counterclockwise rotation of the actuator member beyond the position shown in Fig. 46, the cam notch 114 will suddenly release the tab 150 on the resiliently flexed spring member for a snap-action of the latter into its bottommost position (Fig. 47).

On continued counterclockwise rotation of the actuator member beyond the position shown in Fig. 47, the next cam track 130 (Figs. 42 and 48) will cooperate with the tab 150 in causing snap-actions of the spring member from its bottommost position into neutral position and then from the latter position into topmost position, as will be readily understood in view of the foregoing detailed description of the performance of the other cam track 110. Thus, the instant movement 10k will, on continued unidirectional rotation of the actuator member 14k, cause alternate snap-actions of the spring member 12k to opposite extreme positions each time via an intermediate neutral or rest position in which the spring member is substantially non-flexed.

Reference is now had to Figs. 49 to 51 which show a modified snap-action movement 10m that differs from the hereinbefore described movements by having a different cam action on the spring member for its resilient flexure and sudden release in its resiliently flexed condition for a snap-action. Thus, the instant modified movement 10m has a rotary "cam" in the form of a lever 152 which with its hub 154 is turnable and axially slidable on a stud 156 on a support 158, and is provided at its free end with a lateral lug 160 that is to cooperate with the tab end 162 of the spring member 12m. Assuming that the cam lever 152 is in the position shown in Figs. 49 and 50, a snap-action of the spring member 12m is achieved on turning the cam lever, by any suitable means, clockwise from the position shown in Fig. 50. In thus turning the cam lever 152, the end lug 160 thereon will flex the spring member 12m about the hub 154 of the cam lever as a fulcrum (Fig. 51) while the free end of the spring member will simultaneously be gradually cammed from beneath the end lug 160 on the cam lever. Thus, as the cam lever 152 reaches the position shown in Fig. 51, the resiliently flexed spring member is about to be released from the end lug 160 on the cam lever, and will suddenly be released for a snap-action on slight continued rotation of the latter clockwise beyond the position in Fig. 51. In order to bring the end lug 160 on the cam lever 152 into operative realignment with the spring member for the next snap-action of the latter, the cam lever is axially slid on the stud 156 into engagement with the support 158 so that the end lug 160 will clear the spring member, as is shown in dot-and-dash lines in Fig. 49. The cam lever 152 is thereupon turned in the opposite direction, i.e., counterclockwise as viewed in Fig. 51, until the end lug 160 on the cam lever is above the free end 162 of the spring member which is then in the normally non-flexed condition shown in Fig. 50, whereupon the cam lever is axially slid on the stud 156, preferably into engagement with a collar 164 on the latter, thereby bringing the end lug on the cam lever into operative realignment with the spring member for its next snap action.

Reference is now had to Figs. 52 to 54 which show another modified snap-action movement 10n that has a similar cam action on the spring member as the movement 10m just described, but differs significantly from the latter by shifting the fulcrum about which the spring member is flexed out of the plane of the latter in its non-flexed condition. Thus, the rotary "cam" of the instant modified movement 10n is a double-arm lever 166 having opposite pins 168 and 170 and being with its hub 172 turnable and axially slidable on a stud 174 on a support 176. The pins 168 and 170 are adapted to cooperate, in the present instance, with a side tab 178 on the spring member 12n in resiliently flexing the latter and suddenly releasing it in its resiliently flexed condition for a snap-action. Assuming that the cam lever 166 is in the position shown in Figs. 52 and 53, a snap-action of the spring member is achieved on turning the cam lever, by any suitable means, clockwise from the position shown in Fig. 53. In thus turning the cam lever, the pins 168 and 170 thereon will twist the tab 178 on the spring member out of the plane of the latter in its non-flexed condition, thereby resiliently flexing the spring member as shown in Fig. 54. It will be observed from Fig. 54 that the pin 170 has flexed the spring member about the other pin 168 as a fulcrum which, in the course of the preceding clockwise rotation of the cam lever 166, has shifted out of the plane of the spring member in its non-flexed condition, wherefore this shift of the fulcrum pin 168 as well as the flexure of the spring member are factors which in this case expedite the withdrawal of the tab 178 on the spring member from beneath the other pin 170. Thus, on slight further rotation of the cam lever 166 clockwise beyond the position in Fig. 54, the pin 170 will suddenly release the tab on the resiliently flexed spring member for a snap-action of the latter, as will be readily understood. For the next snap-action of the spring member, the pin 170 is operatively realigned with the tab 178 on axially retracting the cam lever 166 on the stud 174 into engagement with the support 176, then turning the cam lever until the pin 170 thereon is above the tab on the then non-flexed spring member, and finally axially advancing the cam lever on the stud 174 to bring the pin 170 into operative realignment with the tab 178 (Fig. 53).

While in each of the hereinbefore described snap-action movements, save that of Fig. 15, the spring member is flexed in S fashion prior to its release for a snap-action, Figs. 55 to 57 show a modified snap-action movement 10o in which the spring member is, prior to its release for a snap-action, flexed in simple fashion without any reverse curvature. To this end, there is interposed between the spring member 12o and tab 26o a tongue 180 of some lengthwise extent longitudinally of the spring member. The spring member 12o, tongue 180 and tab 26o are integral with each other and in this instance also coplanar. Assuming that the actuator member 14o with its cam track 28o is in the position shown in Figs. 55 and 56, a snap-action of the spring member 12o is achieved on moving the actuator member 14o to the right from the position in Fig. 56, in the course of which the cam track 28o will come into cooperative relation with the tab 26o and flex the tongue 180 which, in turn, will react with the spring member 12o in flexing the latter in the manner shown in Fig. 57. On slight continued movement of the actuator member 14o to the right beyond the position shown in Fig. 57, the cam track 28o will release the tongue 180 and the spring member 12o in their resiliently flexed condition for a relatively mild snap-action of the latter, as will be readily understood. In order operatively to realign the cam track 28o with the tab 26o for the next snap-action of the spring member 12o, it is merely necessary to move the actuator member in either direction until the latter, or a clearance notch therein (not shown), clears the tab 26o, whereupon the spring member will snap to its normally non-flexed condition above the actuator member.

Reference is now had to Figs. 58 to 60 that show another modified snap-action movement 10p of which the spring member, like that of the movement 10o just described, has in general a relatively mild snap-action requiring a comparatively small driving force for the actuator member, but which, in distinct contrast to the spring member of the movement 10o, is flexed in S fashion prior to its release for a snap-action. To this end, the "tab" on the spring member 12p is divided into two separate sections 26p' and 26p'' of which section 26p' is in the form of a side extension directly on the spring member, while the other section 26p'' is a side extension on one end of a tongue 182 which at its other end joins the spring member. The tongue 182 is of some lengthwise extent longitudinally of the spring member (Fig. 58), and the tab sections 26p', 26p'' and the tongue 182 are integral with the spring member and presently also coplanar therewith.

Assuming that the actuator member 14p with its cam track 28p is in the position shown in Figs. 58 and 59, a snap-action of the spring member will be achieved on movement of the actuator member to the right as viewed in Fig. 59. In the course of such movement of the actuator member, the tab section 26p'' will by the inclined tongue 32p of the cam track 28p be cammed underneath the actuator member while the other tab section 26p' is held on top of the actuator member, resulting in relatively moderate S flexure of the spring member as indicated in Fig. 60, this by virtue of the fact that the resiliently flexed tongue 182 reacts with the spring member 12p at a quite considerable distance from the other tab section 26p'. On continued slight movement of the actuator member 14p to the right beyond the position shown in Fig. 60, the cam track 28p will suddenly release the tab section 26p' for a correspondingly moderate snap-action of the spring member, as will be readily understood. In order operatively to realign the cam track 28p with the tab sections 26p' and 26p'' for the next snap-action of the spring member, the actuator member 14p may be moved in either direction until it, or a clearance notch therein (not shown) clears the tab sections, whereupon the spring member is free to recover to its normally non-flexed condition above the actuator member.

While in each of the hereinbefore described snap-action movements a whip-like snap-action of an endlength of the spring member is utilized for any intended practical application of these movements, Figs. 61 to 63 show a further modified snap-action movement 10r in which the lengthwise snap-like recovery of the spring member on its sudden release in resiliently flexed condition is utilized for any intended practical application. To this end, the spring member 12r of the instant modified movement 10r is at one end firmly supported on a block 184, while its other end is guided for movement lengthwise of the spring member, presently by carrying a transverse pin 186 which is received with its opposite ends in a guideway 188 in a block 190.

Assuming now that the spring member 12r is in normally non-flexed condition beneath the actuator member 14r and its side tab 26r is in operative alignment with the cam track 28r in the actuator member, i.e., to the right thereof as viewed in Figs. 61 to 63, a snap-action of the spring member 12r will be achieved on movement of the actuator member to the right into operative relation with the tab 26r, resulting in resilient flexure of the spring member as indicated in Fig. 62 and, accordingly, in retraction of the crosspin 186 at the free end of the spring member in its guideway 188. On slight continued movement of the actuator member 14r to the right beyond the position shown in Fig. 62, the cam track 28r will suddenly release the tab 26r on the resiliently flexed spring member 12r for a snap-action of the latter (Fig. 63) which carries the crosspin 186 forwardly in its guideway 188, as will be clearly perceived on comparing Fig. 63 with Figs. 61 and 62. It is this snap-like forward thrust of the guided crosspin 186 and, hence, of the free end of the spring member which is utilized for any intended practical application of the movement.

The tab 26r on the spring member lies after each snap-action of the latter on top of the actuator member in a fashion like or similar to that shown in Fig. 63. In order to bring the cam track 28r into operative realignment with the tab 26r for the next snap-action of the spring member, the actuator member 14r is moved in either direction until it, or a clearance notch therein (not shown), clears the tab, whereupon the spring member is free to recover to its normally non-flexed condition beneath the actuator member.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A snap-action movement, comprising two members of which one is a resiliently flexible leaf member of longitudinal extent having a first length and a continuing length and being of greater width than thickness and supported solely at one end so as normally to extend widthwise in a plane in resiliently non-flexed condition, said members having operatively aligned and lengthwise relatively included cam-track and follower-tab formations, respectively, longitudinally of said leaf member of which the formation on the latter is remote from said one end thereof, and said members are relatively movable in said plane to bring said formations into cooperative relation with each other for torsionally twisting said first length of said leaf member about a transverse axis of the latter within said first length and lying in the plane of the leaf so as to compel said continuing length of said leaf member extending to said one end into resilient S flexure, and for suddenly releasing said first length in its twisted condition for a resilient snap-action of said leaf member.

2. A snap-action movement as set forth in claim 1, in which said leaf member has another end opposite to said one end and another length continuous with said first length and extending to said other end.

3. A snap-action movement as set forth in claim 1, in which said formations are arranged to induce longitudinal tension in said continuing length of said leaf member while the same is compelled into said resilient S flexure.

4. A snap-action movement as set forth in claim 1, in which said members are relatively movable longitudinally of said leaf member.

5. A snap-action movement as set forth in claim 1, in which said follower-tab and cam-track formations are provided on said leaf member and the other member, respectively.

6. A snap-action movement as set forth in claim 1, in which said leaf member is immovable at said one end and is provided with said follower-tab formation, and the other member is turnable and has at its periphery said cam-track formation.

7. A snap-action movement as set forth in claim 1, in which said leaf member is immovable at said one end and provided with said follower-tab formation, and the other member is mounted for reciprocation and provided with said cam-track formation.

8. A snap-action movement as set forth in claim 1, in which said follower-tab formation is an integral side extension of said leaf member extending coplanar therewith.

9. A snap-action movement as set forth in claim 1, in which said follower-tab formation is formed by adjacent separate tab sections coplanar with said leaf member, of which one tab section is an integral extension of said leaf member at one side edge thereof and the other tab section is an integral side extension on one end of a tongue integral and coplanar with, and extending longitudinally along said one side edge of, said leaf member and joining the latter remotely from said other tab section and from said one end of said leaf member.

10. A snap-action movement as set forth in claim 1, in which the other member is rigid and has a margin, and said cam-track formation is constituted by a notch in said margin of longitudinal extent lengthwise of the latter, and a cam lug integral with said margin and having a surface extending within and beyond the confines, and defining one end, of said notch with said surface being throughout inclined to said margin to form therewith an acute angle pointing away from said notch.

11. A snap-action movement as set forth in claim 1, in which the other member is of metal plate stock and has a margin, and said cam-track formation is constituted by a notch in said margin of longitudinal extent lengthwise of the latter formed therein by stamping therefrom a tongue left continuous with said margin at one end of said notch and bent to form with said margin an acute angle pointing away from said notch.

12. A snap-action movement, comprising two members of which one is a resiliently flexible longitudinal member fixedly supported at one end and guided for lengthwise movement at its other end, said members having operatively aligned and lengthwise relatively inclined cam-track and follower-tab formations, respectively, longitudinally of said one member of which the formation on the latter is intermediate and spaced from said ends thereof, and the other member is movable to bring said formations into cooperative relation with each other for resiliently flexing said one member in S fashion, and suddenly releasing the latter in its resiliently flexed condition for a snap-like thrust action of its guided end.

13. A snap-action movement, comprising two members of which one is a resiliently flexible longitudinal member supported at one end and having a lateral follower-tab formation remote from said one end, and the other member having spaced cam-track formations lengthwise oppositely inclined to each other and to said tab formation and operatively aligned with the latter, said members being relatively movable to bring said follower-tab formation and cam-track formations, respectively, into cooperative relation with each other for twisting a first length of said one member in opposite directions, respectively, so at to compel a continuing length thereof extending to said one end into resilient flexure, and suddenly releasing said first length in its twisted conditions for resilient snap-actions of said one member in opposite directions, respectively.

14. A snap-action movement as set forth in claim 13, in which said one member is at said one end thereof fixedly supported, and said other member is a rotatable disc having at its periphery said cam-track formations so arranged that the latter will successively cooperate with said follower-tab formation on rotation of said disc in one direction.

15. A snap-action movement as set forth in claim 13, in which said one member is at said one end thereof fixedly supported, and said other member is reciprocable and said cam-track formations thereon are arranged to cause twisting of said first length of said one member and resilient snap actions of the latter in said opposite directions on movements of said other member in the same direction, respectively.

16. A snap-action movement as set forth in claim 13, in which said one member is at said one end thereof fixedly supported and said other member is reciprocable, and said formations are so arranged as to cause twisting of said first length of said one member and resilient snap-actions of the latter in said opposite directions on successive reciprocations, respectively, of said other member.

17. A snap-action movement as set forth in claim 13, in which said formations are so arranged as to cause twisting of said first length of said one member and resilient snap-actions of the latter in said opposite directions on relative movement between said members in opposite directions, respectively.

18. A snap-action movement as set forth in claim 13, in which said one member is at said one end thereof fixedly supported and said other member is reciprocable, and said formations are so arranged as to cause twisting of said first length of said one member and resilient snap-actions of the latter in said opposite directions on successive motions of said other member in opposite directions, respectively, of each reciprocation thereof.

19. A snap-action movement as set forth in claim 13, in which said cam-track formations have spaced sections, respectively, arranged to cooperate with said follower-tab formation in twisting said first length of said one member and suddenly releasing the latter for snap-actions repeatedly in each of said opposite directions each time into and from a substantially non-flexed condition of said one member.

20. A snap-action movement, comprising two members of which one is a resiliently flexible longitudinal member supported at one end and having two longitudinally spaced lateral follower tabs on which one tab is closest to and spaced from said one end and the other tab is spaced from the latter by a length of said one member, and the other member having a cam track inclined to said one member and operatively aligned with said one tab and cooperating therewith on relative movement between said members in opposite directions in displacing said one tab in opposite directions, respectively, while said other tab engages said other member and is held thereby against displacement with said one tab, thereby resiliently flexing said length of said one member in opposite S fashion, respectively, said other member also having two spaced notches so arranged as to clear and suddenly release said other tab for resilient displacement in the same opposite directions, respectively, as said one tab and resulting snap-actions of said one member on relative movement between said members in said opposite directions, respectively.

21. A snap-action movement, comprising two members of which one is a resiliently flexible longitudinal member fixedly supported at one end and guided for lengthwise movement at its other end, said members having operatively aligned and lengthwise relatively inclined cam-track and follower-tab formations, respectively, longitudinally of said one member of which the formation on the latter is intermediate and spaced from said ends thereof, and the other member is movable to bring said formations into cooperative relation with each other for resiliently flexing said one member, and suddenly releasing the latter in its resiliently flexed condition for a snap-like thrust action of its guided end.

22. A snap-action movement, comprising relatively movable members of which one is a resiliently flexible longitudinal leaf member of longitudinal extent having a first length and a continuing length and being of greater width than thickness and supported solely at one end so as normally to be resiliently non-flexed, said members having means, respectively, cooperating on relative movement between said members torsionally to twist said first length of said leaf member about an axis extending transversely of the longitudinal extent of said leaf member within said first length thereof and widthwise of the leaf so as to compel said continuing length thereof extending to said one end into resilient S flexure, and suddenly to release said first length in its twisted condition for resilient snap-action recovery of said leaf member.

23. A snap-action movement, comprising two relatively movable members of which one is a resiliently flexible longitudinal leaf member of longitudinal extent having a first length and a continuing length and being of greater width than thickness and supported solely at one end so as normally to be resiliently non-flexed, and resiliently flexible from a first plane in which it lies widthwise when non-flexed; and devices on said members, respectively, arranged to cooperate on relative movement between the latter torsionally to twist said first length of said leaf member about an axis extending transversely of the longitudinal extent of said leaf member within said first length thereof and widthwise of the leaf so that the ends of said first length of the leaf member lie on opposite sides of said first plane, thereby compelling said continuing length of said leaf member extending to said one end into resilient S flexure, and suddenly to release said first length in its twisted condition for resilient snap-action recovery of said leaf member.

24. A snap-action movement, comprising two members of which one is a resiliently flexible leaf member of longitudinal extent having a first length and a continuing length and being of greater width than thickness and supported solely at one end so as normally to be resiliently non-flexed, and having a lateral follower-tab formation remote from said one end, and the other member having spaced cam-track formations operatively aligned with and lengthwise inclined to said tab formation, said members being relatively movable to bring said tab formation and cam-track formations, respectively, into cooperative relation with each other for torsionally twisting said first length of said leaf member about an axis extending transversely of the longitudinal extent of said leaf member within said first length thereof and widthwise of the leaf so as to compel said continuing length of the leaf member extending to said one end into resilient S flexure, and suddenly releasing said first length in its twisted condition for a resilient snap-action of said leaf member on cooperation of said follower-tab formation with each of said cam-track formations.

References Cited in the file of this patent

UNITED STATES PATENTS

| 2,602,126 | Morrison | July 1, 1952 |
| 2,625,629 | Coldwell | Jan. 13, 1953 |
| 2,724,276 | Sears | Nov. 22, 1955 |

FOREIGN PATENTS

| 956,154 | France | Jan. 25, 1950 |